United States Patent [19]
Flame et al.

[11] Patent Number: 5,914,574
[45] Date of Patent: Jun. 22, 1999

[54] STRAY EMISSION REDUCTION CIRCUIT

[75] Inventors: Hsu Flame, Chung-Li, Taiwan; Seng Huat Ng; Chun-Hsing Wu, both of Singapore, Singapore

[73] Assignee: Thomson Multimedia S.A., Boulogne Cedex, France

[21] Appl. No.: 08/847,028

[22] Filed: May 1, 1997

[30] Foreign Application Priority Data

May 30, 1996 [GB] United Kingdom .................... 9611241

[51] Int. Cl.⁶ .............................. H04N 5/63; H04N 5/68; H04N 3/16; G09G 1/04
[52] U.S. Cl. ........................... 315/411; 315/380; 315/408
[58] Field of Search ................................... 315/380, 409, 315/410, 411, 384

[56] References Cited

U.S. PATENT DOCUMENTS

| | | | |
|---|---|---|---|
| 3,956,669 | 5/1976 | Del Ciello | 315/411 |
| 5,142,206 | 8/1992 | Gries | 315/408 |
| 5,184,225 | 2/1993 | Heidebroek et al. | 358/243 |
| 5,266,870 | 11/1993 | Jang | 315/411 |

FOREIGN PATENT DOCUMENTS 0527328  2/1993  European Pat. Off. ......... H04N 5/63

*Primary Examiner*—Edward P. Westin
*Assistant Examiner*—Shane R. Gardner
*Attorney, Agent, or Firm*—Joseph S. Tripoli; Joseph J. Laks; Sammy S. Henig

[57] ABSTRACT

The most popular method for reducing stray emission effects in a cathode ray tube is to install a bleeder resistor at the flyback transformer of the tube. Such a bleeder resistor is, however, quite expensive. Therefore, the stray emission reduction circuit according to the invention differentiates the H pulse when the TV set is switched from "on" to "standby" which results in a higher duty cycle of the control transistor, implying a lower duty cycle of the horizontal output transistor HOT. This results in a lower voltage at the tuning capacitor and hence lowers the flyback peak voltage at the anode. This results in a drop of the EHT voltage.

10 Claims, 4 Drawing Sheets

STRAY EMISSION REDUCTION CIRCUIT

FIELD OF THE INVENTION

The invention relates to television receivers in which provisions are made for preventing the appearance of certain visual artifacts (e.g., after-glow phenomena) from appearing because of a transition from the normal "run" or "on" mode of operation to a "standby" or "off" mode of operation, and in particular to a circuit for reducing the stray emission in cathode ray tubes.

BACKGROUND OF THE INVENTION

When a television set is switched from the "on" mode to "standby" mode or OFF, a ghost image may appear on some of the used cathode ray tubes (in the following abbreviated as CRT). This effect is called stray emission or after-glow and is normally caused by particles, in other word contamination, trapped at Grid 1 or at Grid 2 of the electron mount, i.e., electron guns, accelerated by the anode voltage (referenced as EHT for extremely high voltage) and hitting on the phosphor of the CRT. Due to the current CRT manufacturing process, it is not possible to eliminate these particles completely. CRT manufacturers normally guarantee that stray emission is suppressed if the EHT voltage is discharged immediately to a specified level (e.g., 18 kV) when the TV set is switched from on to standby.

A couple of methods to discharge the EHT voltage after switching the TV set to "standby" mode or OFF are known.

EP-OS 0 521 378 A discloses a television apparatus including a kinescope having a high voltage supply, a deflection circuit, a cathode driver amplifier and a control circuit for controlling operating modes of the receiver. A first transistor responsive to the turn-off command signal from the control circuit disables the high voltage supply and initiates turn-off of the deflection circuit at a controlled rate. Concurrently, a second means responsive to the turn-off command applies a "turn on drive" signal to at least one of the electron guns of said kinescope for discharging high voltage therefrom. Therefore, during turn-off the high voltage is drained from the kinescope as the display raster collapses thus providing features such as the safety feature of having a fully discharged kinescope, avoidance of kinescope spot burn and preventing of kinescope after-glow.

U.S. Pat. No. 5,266,870 discloses a stray emission prevention circuit for a system having a cathode ray tube including a charging and discharging section for applying a system power supply voltage upon power-on of the system to charge with a constant voltage and for discharging the charged voltage upon power-off of the system, and a switching section for forming an open circuit between a high voltage unit of the cathode ray tube and a ground upon the power-on of the system and forming a closed circuit there between upon the power-off of the system to discharge the residual high voltage in the cathode ray tube, the circuit being provided on a circuit board of the system.

The above methods for preventing stray emission have the disadvantages that they need an extra amount of circuitry which increase complexity and costs.

Further, the most popular and no-hassle method used is to install a bleeder resistor at the fly-back (in the following referenced as FBT) to discharge the EHT voltage transformer, as it will be explained later with the aid of FIG. 6.

Even though the use of a bleeder resistor has its merits, but one of the main disadvantages is the price of having the bleeder resistor installed in the FTB.

It is therefore an object of the present invention to provide a stray emission reduction circuit which is reliable and cost saving.

This object is solved by the features of the present claims. Preferred embodiments are subject of the independent claims.

SUMMARY OF THE INVENTION

The present invention comprises a stray emission reduction circuit with a driver transformer and a horizontal output transistor (in the following referenced as HOT) for controlling the horizontal deflection of the electron beam, wherein the HOT transistor is connected to the high voltage, a control transistor for controlling the HOT, the base of which is connected to the H pulse, and a standby circuit, wherein the H pulse is differentiated if the circuit switches from normal operation to standby operation.

To achieve a low cost circuit, the differentiation of the H pulse is preferably performed by a capacitor, wherein said capacitor is connected to the H-pulse and the base of the control transistor.

Further, the circuit comprises a diode means and a second capacitor means which are arranged in parallel to the first capacitor, so that the H pulse can either pass directly through the diode or through the bypass formed by the second capacitor depending on the mode of operation, i.e., "on" mode or "standby" mode. Preferably, the first capacitor is smaller than the second capacitor. Further, the diode is biased through the standby circuit comprising a standby transistor and a resistor, wherein the diode is preferably biased with a potential $P_1$ if the standby transistor is open.

Further, the H pulse line of the circuit can be grounded with a switch, wherein said switch is realized with a grounding transistor to ground the H line. Preferably the base of the grounding transistor is connected to the potential $P_1$ through resistors.

Further, the base of the control transistor is biased with a potential $P_2$, wherein preferably the biasing potential $P_1$ is approximately 22 V and the potential $P_2$ is approximately 24 V.

The main advantages of the invention are, that it solves the after-glow problem in a cheaper way compared to the bleeder for the anode voltage. The additional components needed are one transistor, five resistors, and two capacitors which cost less than US $ 0.5 compared to US $ 1.5 extra for a bleeder resistor to be installed in the FBT. Further, the circuit design is very simple and for this reason easily adaptable. Such a circuit can be used in most of the present chassis with some modification.

Further, it introduces a soft start from standby to on, so that the HOT turn-on time is gradually increased resulting in a lower voltage and current stress. When switched from on to standby transition, the turn-on time is gradually decreased, so the HOT voltage and current is gradually reduced. Hence, the reliability of the HOT is improved. This is achieved by the gradual switch on and off action of the grounding transistor using the resistors and the capacitors mentioned.

BRIEF DESCRIPTION OF THE DRAWINGS

A preferred embodiment of the invention is now described with reference to the accompanying drawings, wherein.

DETAILED DESCRIPTION OF THE DRAWINGS

Figure 1:
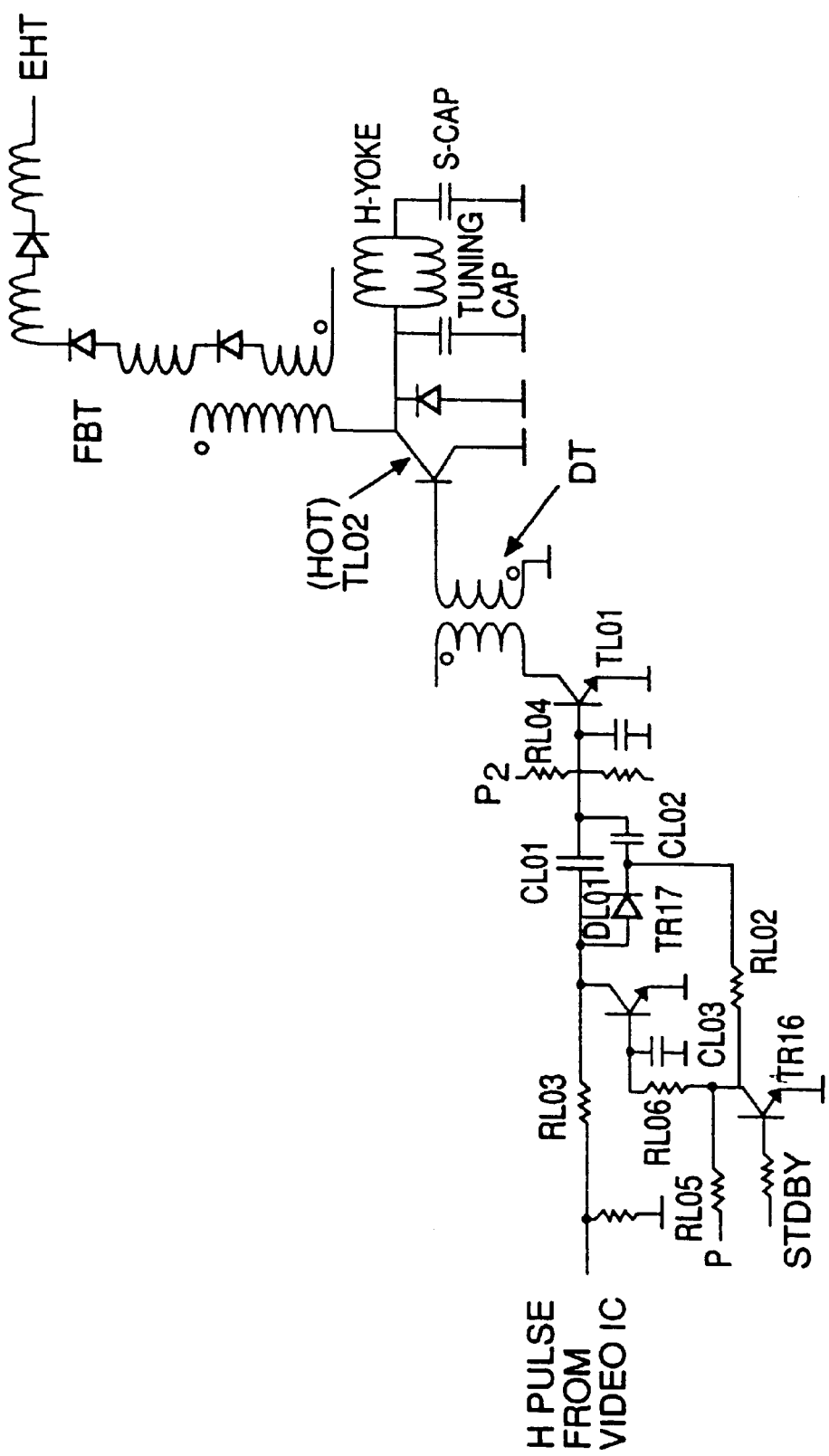
FIG. 1 shows a circuit diagram of the circuit according to a preferred embodiment of the invention.

FIG. 1 is used to explain the principle of a preferred embodiment. In normal operation, when the set is on, transistor TR16 is switched on by the standby signal. This will therefore cut off TR17 and at the same time diode DL01 is forward biased and the H pulse, which is used to switch on and off transistor TL01, is coupled by capacitor CL02 to the base of transistor TL01. The capacitor CL02 has a high value relative to the parallel capacitor CL01. In normal operation, the H pulses are coupled and sufficiently biased by the 24 V to drive the transistor TL01, which in turn controls switching of the HOT transistor TL02 correctly at normal switching frequency (see also FIG. 2).

When the TV set is switched to standby, transistor TR 16 is cut off. Therefore, diode DL01 is reverse biased due to the higher voltage at the point P, which is around 22 V. The interesting part of the invention is that at this moment, due to the small value of the capacitor CL01 and the correct biasing of the 24 V, the H pulses are differentiated which results in a higher duty cycle of the transistor TL01, which in turn implies a lower duty cycle of the HOT transistor (horizontal output transistor) because the driver transformer DT is of opposite polarity between primary and secondary winding. Due to the turn-on time of transistor TL02 being much shorter (10 μs compared to normal operation which is 24 μs), the energy stored in the horizontal deflection circuit is reduced significantly. As in the basic operation of the horizontal deflection circuit in a TV chassis, when the transistor TL02 turns off, the energy begins to oscillate between the tuning capacitor and the deflection circuit. As mentioned earlier, because of the reduced energy storage during the shorter turn-on time, this will result in a lower tuning capacitor voltage (i.e., HOT collector voltage when transistor TL02 is off) and hence a lower flyback peak voltage at the anode voltage, in other words, a drop of the voltage EHT.

Another positive effect of this invention is that at the moment when the TV set is switched from on to standby, transistor TR16 is switched off, capacitor CL03 (which is connected across the base-emitter of transistor TR17) is charged up by the potential $P_1$ at point P, the time constant of which is determined by resistor RL02, resistor RL06 and capacitor CL03, with the result that transistor TR17 is switched on slowly later.

Figure 2:
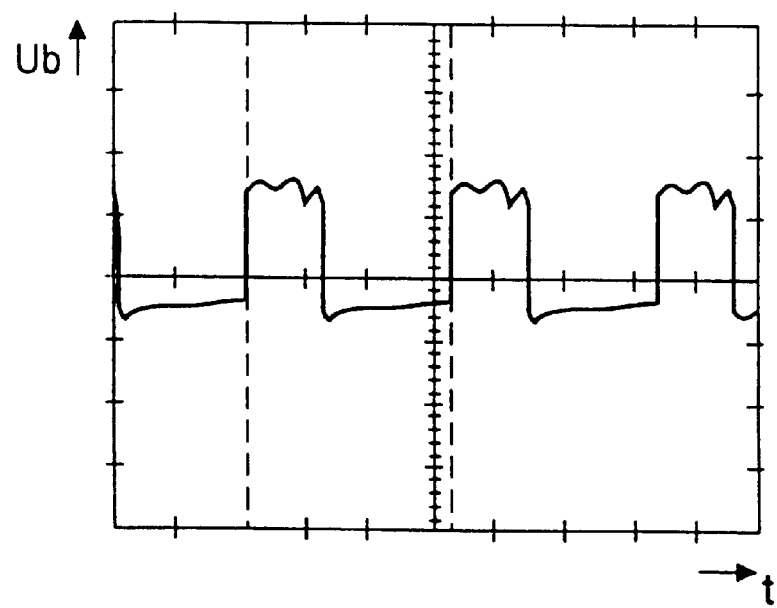
FIG. 2 shows the control transistor base voltage during normal operation.
Figure 3:
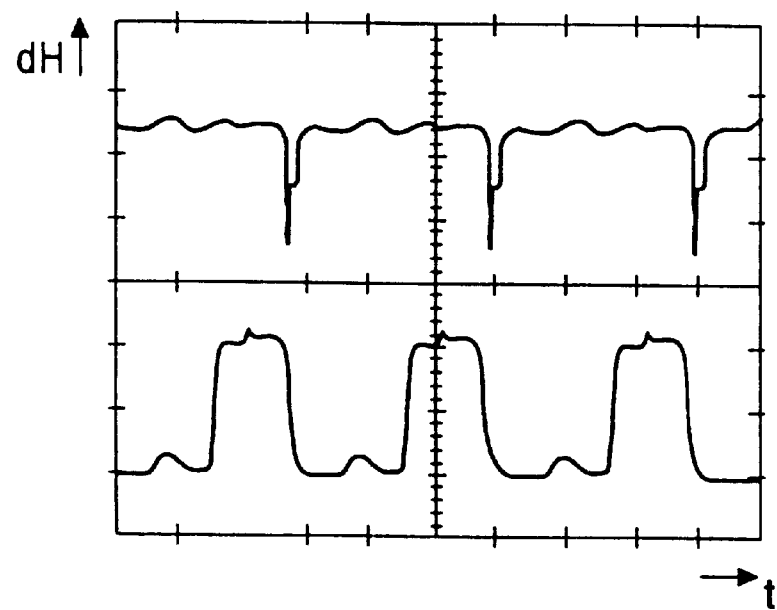
FIG. 3 shows the H pulse and the corresponding derivative pulse.
Figure 4:
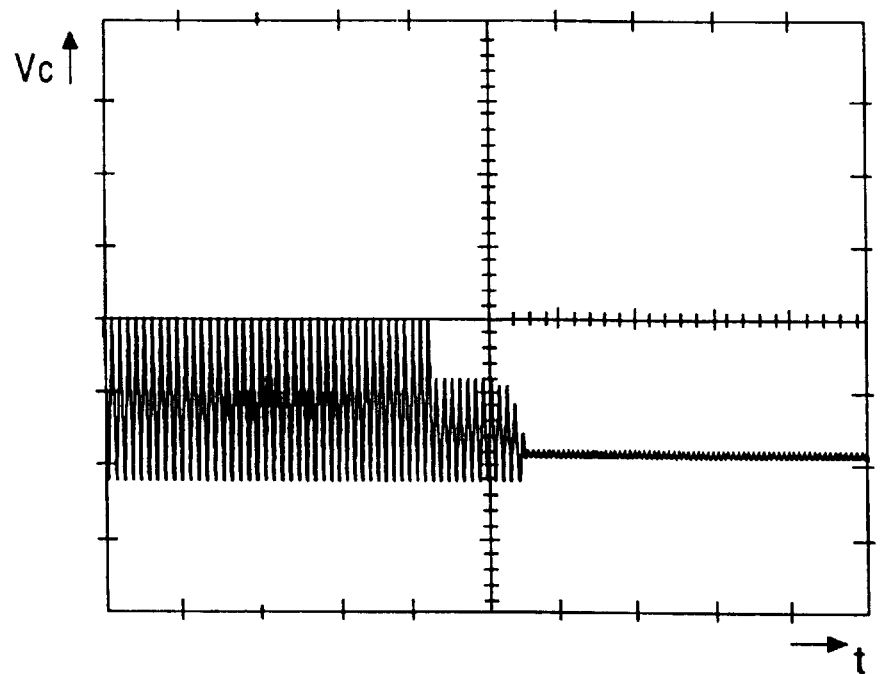
FIG. 4 shows the envelope of HOT collector voltage reduced to lower voltage after the TV set has been switched to standby.

In the following, the vertical axis of FIGS. 2, 3 and 4 shows the measured voltage in arbitrary units and the horizontal axis gives the time in arbitrary units.

FIG. 2 shows the base voltage Ub at the control transistor TLOI during normal operation, i.e., when the applied H pulse passes through upper capacitor CL01 with small capacitance value compared to capacitor CL02.

FIG. 3 shows in the upper part the differentiated H pulse (dH). In the corresponding lower part of FIG. 3 the original H pulse is depicted. In other words, the upper wave form of FIG. 2 shows that when the TV set is switched to standby and transistor TR16 is off, the H pulse is differentiated. The lower pulse is the original H pulse from the video IC before being input to the invented circuit and processed to drive the base of transistor TL01.

FIG. 4 shows the envelope of the HOT collector voltage Vc, which is reduced to a lower voltage after the television set has been switched to standby, as depicted in FIG. 4.

Figure 5:
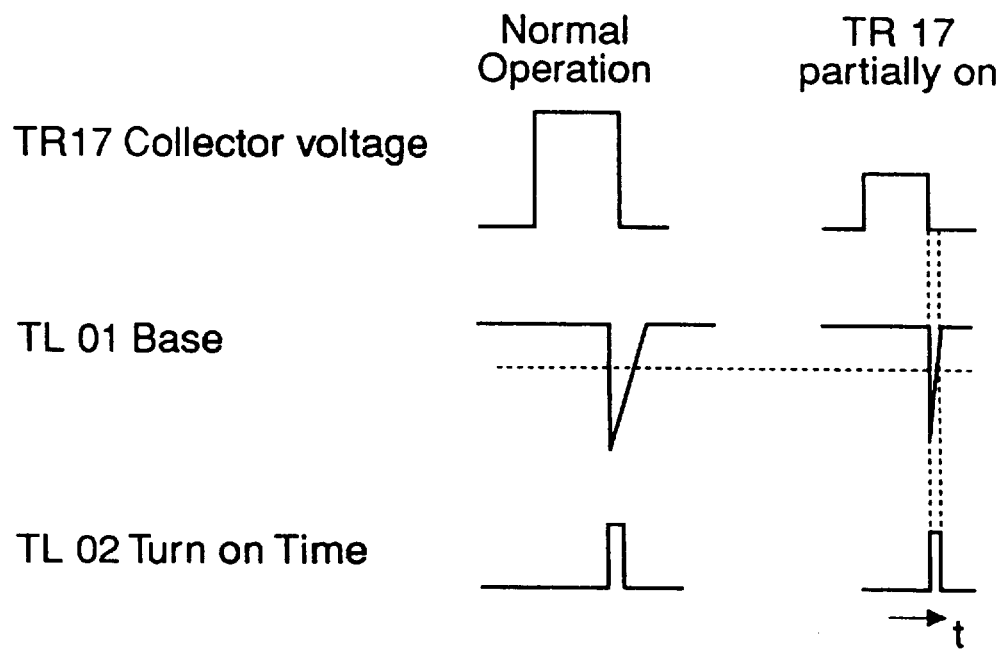
FIG. 5 shows a diagram of grounding transistor collector voltage, control transistor base voltage and HOT turn-on time in the normal operation mode and the mode where grounding transistor is partially on, and FIG. 6 shows a simplified diagram of CRT with a FBT and an intern; bleeder resistor.

FIG. 5 finally shows the effect of lowering the amplitude of the H pulse, which in turn will give an even shorter turn-on time for the HOT transistor. The energy stored will be reduced further and give a lower transistor TL02 collector voltage, so that transistor TL02 is switched off eventually at a lower peak voltage. On the other hand, the set is switched from standby to on, transistor TR17 (right part of FIG. 5) will be switched off gradually because the capacitance CL03 is discharged by a time constant of the value RL05/CL03 as transistor TR16 will be on. This will cause the turn-on time of the HOT transistor to increase progressively, introducing a soft start effect which in turn gives the HOT transistor less voltage and current stress. Therefore, this invention not only serves its main purpose, i.e., to use stray emission, but also further enhances the reliability of the HOT transistor at its switching transition.

Figure 6:
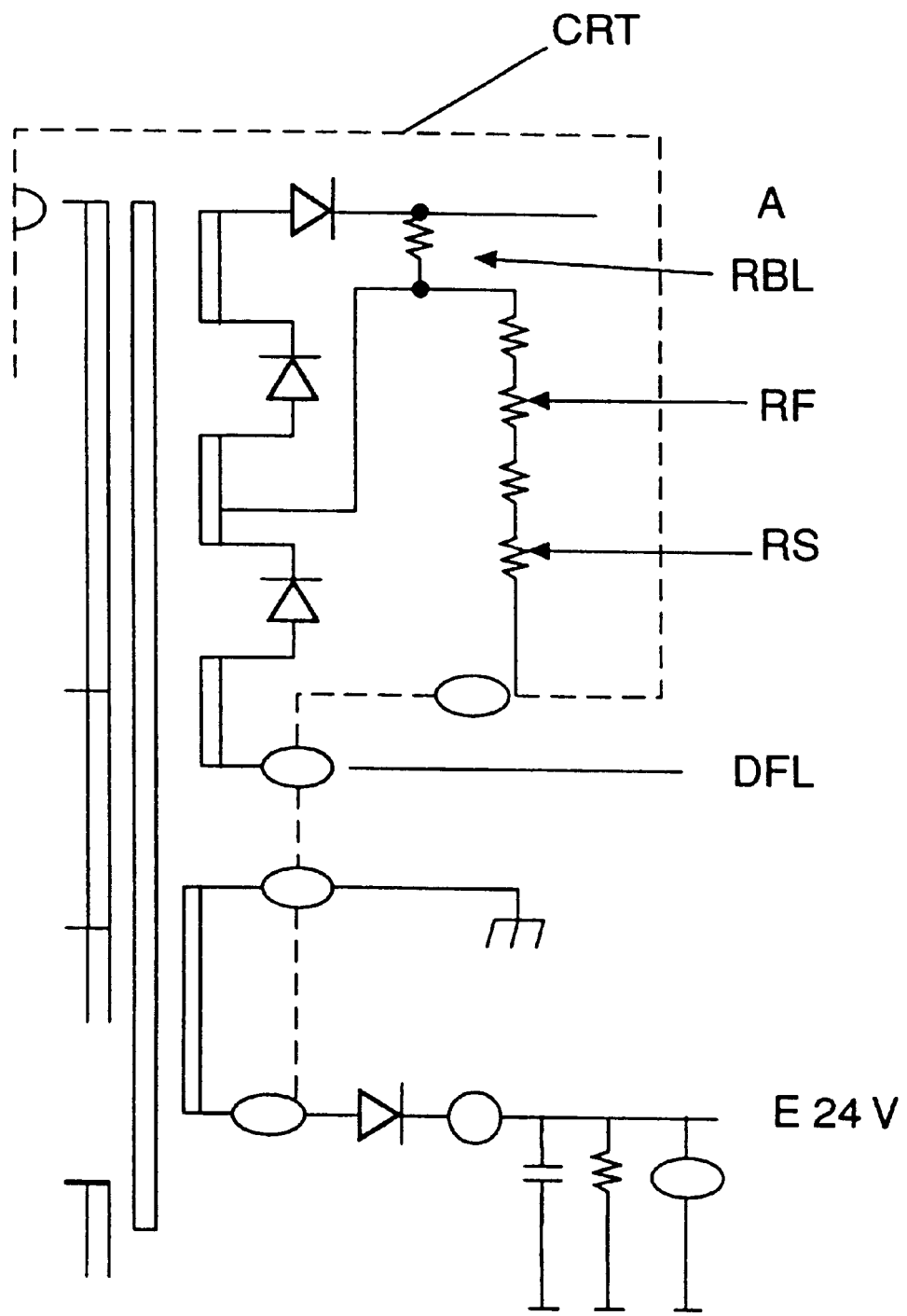

FIG. 6 shows the well known arrangement of a bleeder resistor RBL in a cathode ray tube CRT between the CRT anode A and a resistor chain comprising a focus resistor Rf and screen resistor RS to discharge the high voltage EHT applied to the anode A upon a transition from "on" mode to "standby" mode. The bleeder resistor RBL is of the order of 400 Mohms.

What is claimed is:

1. Stray emission reduction circuit having an output transistor with a base electrode, and an emitter collector path coupled to a high voltage, said output transistor controlling a horizontal deflection of an electron beam, a control transistor with a base and an emitter collector path coupled to said base of said output transistor for controlling said output transistor, said base of said control transistor being coupled to a driving circuit having a first input receiving a stand by signal, said stand by signal having a first and a second value, said stand by signal controlling a first switch of said driving circuit, a second input of said driving circuit receiving an H pulse signal, said driving circuit transmitting the H pulse signal to the base of the control transistor when said first switch is in a first state corresponding to said first value of the stand by signal and transmitting a differentiated signal of said H pulse signal to the base of the control transistor when said first switch is in a second state corresponding to said second value of said stand by signal.

2. Circuit according to claim 1, wherein the differentiation of said H pulse signal is made through a first capacitor being connected between said second input receiving said H pulse signal, and said base of said control transistor, when said first switch is in said second state corresponding to said second value of said stand by signal.

3. Circuit according to claim 2, wherein the circuit further comprises a diode and a second capacitor which are arranged parallel to the first capacitor.

4. Circuit according to claim 3, wherein the first capacitor is smaller than the second capacitor.

5. Circuit according to claim 3, wherein the diode is biased through a transistor and a resistor.

6. Circuit according to claim 1 wherein a line carrying the H pulse signal can be grounded with a second switch of said driving circuit.

7. Circuit according to claim 6, wherein the second switch comprises a grounding transistor having a base electrode.

8. Circuit according to claim 3 wherein the diode is biased with a potential $P_1$ if said first switch of said driving circuit is in an open states said open state corresponding to said second value of said stand by signal.

9. Circuit according to claim 7, wherein the base of the grounding transistor is connected to a potential $P_1$ through resistors.

10. Circuit according to claim 9, wherein the potential $P_1$ is approximately 22 V and wherein the base of the control transistor is biased with a potential $P_2$ which is approximately 24 V.

\* \* \* \* \*